Dec. 12, 1939. W. P. INNES, JR Re. 21,294

SPARK PLUG

Original Filed Dec. 12, 1934

Inventor:
Walter P. Innes, Jr.,
By Dyrenforth, Lee, Chritton & Wilks,
Attys.

Reissued Dec. 12, 1939

Re. 21,294

UNITED STATES PATENT OFFICE 21,294

SPARK PLUG

Walter P. Innes, Jr., Wichita, Kans.

Original No. 2,097,460, dated November 2, 1937, Serial No. 757,206, December 12, 1934. Application for reissue October 30, 1939, Serial No. 301,997

9 Claims. (Cl. 123—169)

My invention relates generally to spark plugs constituting the ignition means of internal combustion engines; my invention as to one phase thereof relating to spark plugs in general, and as to another phase thereof to spark plugs of the chambered type, such as for example as shown in U. S. Letters Patent No. 1,797,817, granted to Earl E. Bidwell March 24, 1931, wherein the spark produced by the plug ignites a relatively small charge of the combustion mixture in a chamber in the plug separated from, but in communication with, the combustion chamber of the engine in which the main charge is fired, whereby the main charge is fired by the jet of flame issuing from the chamber in the plug.

One of my objects is to provide a construction of spark plug wherein accurate adjustment of the electrodes of the plug relative to each other to produce the proper spacing thereof, one from the other, may be effected with ease and great facility.

In connection with another object of my invention and relating to the chambered type of spark plug, it may be stated that as these plugs have hitherto been provided, both of the electrodes are located wholly within the chamber in the plug, resulting under certain conditions of use, in the befouling of certain of the electrodes by the accumulation thereon of carbon and/or oxide with consequent impairment of the plug for functioning due to the fact that the temperature within the chamber in the plug, and which is lower than that in the main combustion chamber of the engine, is not sufficient to maintain the electrodes hot enough to clear them of such befouling accumulations.

It is my object in this connection to provide a spark plug of the chambered type in which the heat generated by the burning fuel in the engine shall be utilized to an extent sufficient to maintain the electrodes free of carbon and oxide deposits, thereby to insure the proper functioning of the plug, especially under the varied conditions presented by different engines.

Another object is to provide improvements in spark plugs of the chambered type to the end that the plug, as to its construction, will follow the lines in general of the standard designs of spark plugs; and other objects as will be manifest from the following description.

Referring to the accompanying drawing in which I have illustrated my invention as embodied in several different forms of structure:

Figure 1:
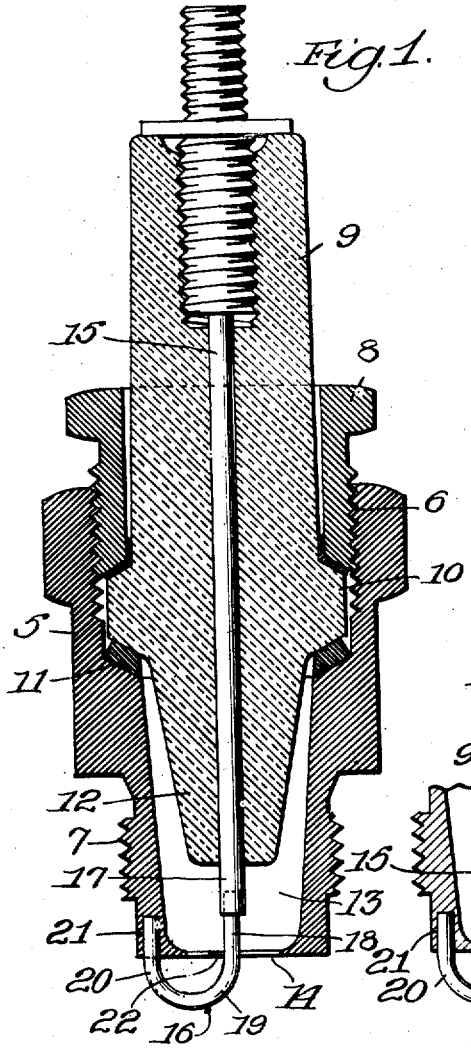
Figure 1 is a view in longitudinal sectional elevation of a spark plug of the chambered type and embodying my invention.

In accordance with the particular embodiment of my invention illustrated in Figs. 1 and 2, the plug comprises a metal shell 5 open at its opposite ends at which it is internally and externally threaded, respectively, as represented at 6 and 7, the internal thread 6 being provided to receive a threaded gland represented at 8 for a purpose hereinafter explained and the thread 7 being provided for the screwing of the plug into the usual threaded hole provided in the cylinder of an internal combustion engine for receiving a spark plug.

The plug also comprises a center, or core, member 9 of current-insulating material, as for example porcelain, which seats at its enlarged annular portion 10 upon an annular seat 11 in the interior of the shell 5, the core 9 being held in place by the gland 8.

The lower end 12 of the core 9 is of less diameter than the space within the shell 5 into which this part of the core extends, the core-end 12 reaching short of the bottom of this space, thus forming, with the shell 5, a chamber 13 into which, it is designed, a portion of the charge of combustion mixture enters from the combustion chamber of the engine to which the plug is applied, to be fired therein for producing the projection of a jet of flame through the lower open end of the chamber 13 and into the main charge in the combustion chamber of the cylinder to fire the latter, the opening at the lower end of the chamber 13 and which is restricted as compared with the diameter of this chamber, being indicated at 14. The size and shape of the chamber 13 and the dimensions of the opening 14 are such, as shown, as to cause the spark plug to operate with the maximum efficiency and dependability in the firing of the main charge in the combustion chamber by means of the jet of flame produced in the chamber of the plug.

The electrodes of this construction are shown at 15 and 16, the electrode 15 being shown as of common form and provided centrally in the core 9 with its lower end portion 17 projecting part way into the chamber 13.

The electrode 16 preferably, is carried by the metal shell 5, extends across the lower end of this shell and has a portion 18 which projects upwardly through the opening 14 and into the chamber 13 to a position for proper cooperation with the electrode portion 17 to form a suitable spark gap within the chamber 13.

Preferably the electrodes are so proportioned and arranged as shown in Fig. 1 that the electrode portion 18 extends to a position above the lower extremity of the electrode portion 17 as shown by dotted lines in Fig. 1, the electrode portion 18 extending alongside and lengthwise of the electrode portion 17 thereby forming a spark gap extending crosswise of the plug. The electrode 16 has a portion represented at 19 which extends crosswise of the lower end of the shell 5 exteriorly of the chamber 13 and preferably in suitably spaced relation to the underside of the shell 5 as shown, the portion 18 of this electrode which directly cooperates with the electrode portion 17 to form the spark gap extending upwardly from the portion 19 and through the opening 14 into the chamber 13.

To provide an electrode 16 having the characteristics above noted, it is preferred that the electrode be provided of general U-shape as shown and above referred to, although other shapes may be employed which are arranged to be in good heat conductive relation to the region just below said end wall. The electrode 16 as shown is supported in position on the shell 5 by the attachment thereof to the shell 5 at the leg portion 20 of the electrode, the portion 20 which opposes the leg comprising the electrode portion 18, being shown as fitted into a downwardly opening socket 21 in the shell 5.

The provision of the electrode 16 with a portion which extends exteriorly of the chamber 13 and in a position in which it is subjected to the heat generated by the burning gases in the combustion chamber of the engine cylinder, as shown and described, is of great advantage in a construction of this kind due to the fact that the electrode 16 becomes the heating element of the device and objectionable deposits of carbon and scale on the electrodes is avoided, it being understood that each time a fresh charge of combustible mixture is introduced into the engine cylinder, (a part of which enters the chamber 13), the electrode 16 becomes covered with the combustible mixture and this electrode being very hot, complete combustion of the mixture on the electrode is effected, upon the firing of the charge, the adaptability of the electrode 16 for performing as the heating element of the device being augmented by reason of its relatively great length as compared with an electrode located wholly within the chamber of the plug. By the construction shown I am thus enabled to utilize the high heat in the combustion chamber of the engine, and which is considerably higher than that which exists in the chamber 13 of the plug, for the maintaining of the electrodes clear of carbon and oxide deposits.

Furthermore, as will be understood, the electrode 16 is not only subjected to the action of the heat generated by the burning charge, causing it to become heated as stated and minimizing carbonization; but is also subjected to the mechanical force exerted against it by the surging of the vapor into the plug-chamber and the blasting force of the gases ignited in the plug-chamber and discharged through the opening in the plug into the combustion chamber, this force serving to blow off accumulations on the electrode 16 which is directly in the path of the blast.

The spacing of the electrode portion 19 from the underside of the shell 5 is of advantage as should there happen to be a tendency to accumulation of carbon on the electrode 16, the danger of such accumulation building up to an amount sufficient to span the space between the underside of the shell 5 and the electrode 16, thus impairing the operation of the plug, is avoided.

In accordance with one phase of my invention provision is made for adjusting the electrode 16 relative to the electrode 15 for the production of the desired length of spark gap.

Figure 2:
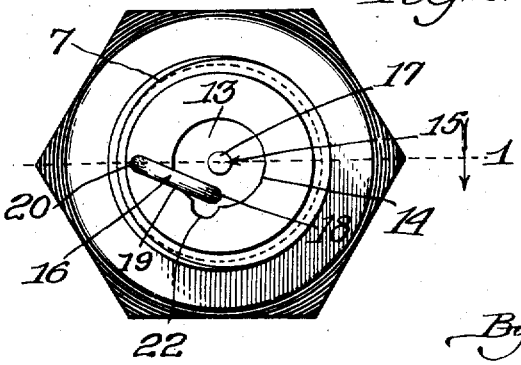
Figure 2 is a bottom plan view of the plug of Fig. 1.

In accordance with the disclosure in Figs. 1 and 2, the adjustability referred to is provided for by providing such looseness of fit of the electrode portion 20 in the socket 21 as to permit the electrode 16 to be rotated about the portion 20 as an axis, but sufficiently tight to maintain the electrode against accidental displacement from adjusted position, the wall of the opening 14 being recessed as represented at 22 to provide the desirable clearance between the electrode portion 18 and the wall of this opening to insure against objectionable bridging by carbon deposits.

By the arrangement shown it is possible to quickly and accurately adjust the electrodes for the desired length of spark gap, such adjustment, when the electrodes sidewise lap each other as shown in Figs. 1 and 2, being readily and easily effected by sliding a suitable gage stick lengthwise through the opening 14 into the space between the electrodes 15 and 16.

It will be noted that in the particular construction now being described the distance between the electrode portions 18 and 20 is substantially the same as that between the electrode portion 20 and the electrode portion 17, whereby the swinging adjustment of the electrode 16 is particularly useful in providing for the desired length of spark gap.

Certain features of the invention may be utilized in a construction in which the cooperating portions of the electrodes instead of lapping sidewise as in Figs. 1 and 2, extend in endwise spaced relation whereby the spark gap extends lengthwise of the plug instead of crosswise thereof.

Figure 3:
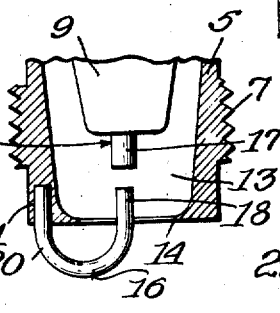
Figure 3 is a view like Fig. 1 of the lower end of a spark plug constituting another embodiment of my invention in a plug of the chambered type.

Fig. 3 shows the plug of Figs. 1 and 2 modified in the particular just referred to and wherein the same numerals are used as in Figs. 1 and 2, the only substantial change being in the provision of the electrode portion 18 as sufficiently short to extend in the desired spaced relation to the electrode portion 17 in the direction of the length of the plug when the electrode is swung to a position in which these electrode portions longitudinally aline.

Figure 4:
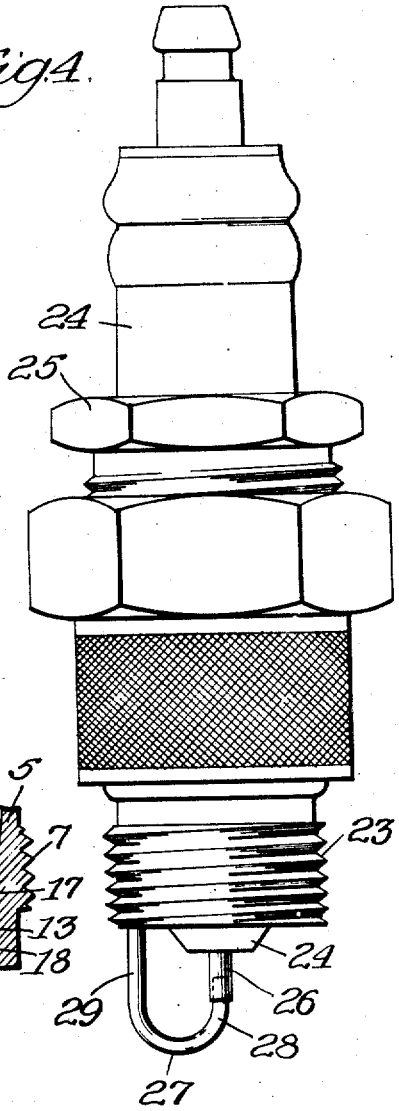
Figure 4, a view in side elevation of a standard form of spark plug of the unchambered type modified to embody one of the features of my invention.

The electrode adjustment feature as described above in connection with Figs. 1 and 2 may also be utilized in a spark plug of the standard or conventional unchambered type, Fig. 4 showing such a spark plug modified to embody this feature of my invention.

As the details of construction of a standard or conventional plug are well known it is not necessary to describe in detail the plug shown in Fig. 4, it being sufficient to state that the threaded metal shell thereof is represented at 23, the porcelain core at 24, the gland holding the core to the shell, at 25, and the central electrode provided within the core 24, at 26.

The other electrode of this plug, in accordance with the present invention is represented at 27 and is preferably of general U-shape shown, its leg portion 28 extending along the side of the electrode 26 as described of the electrode portion 18 in Figs. 1 and 2 and its other leg portion 29 pivoted in a downwardly opening socket (not shown) in the shell 23 to provide for rotatable adjustment of the electrode 27, as described of the electrode 16 in Figs. 1 and 2.

While I have illustrated and described my invention as embodied in several particular forms of construction, I do not wish to be understood as intending to limit it thereto as the same may be variously modified and altered and the invention embodied in other forms of structure without departing from the spirit of my invention.

What I claim as new, and desire to secure by Letters Patent, is:

1. A spark plug comprising a shell having a chamber formed therein, a wall portion adjacent the end of said plug providing an end wall for said chamber, said end wall having an opening formed therein adjacent the longitudinal center line of the plug, a central electrode extending into said chamber, and a substantially U-shaped ground electrode extending across the outer side of said end wall to adjacent the central portion of the plug and thence into said chamber to adjacent said central electrode.

2. A spark plug comprising a shell having a chamber formed therein, said shell having a relatively thin wall portion providing an end wall for said chamber adjacent the end of said plug, said wall having an opening formed therein adjacent the longitudinal center line of the plug and of substantially less diameter than the diameter of said chamber, a central electrode extending into said chamber, and a substantially U-shaped ground electrode extending across a substantial portion of the outer side of said end wall to adjacent the central portion of the plug and thence into said chamber to adjacent said central electrode.

3. A spark plug comprising a shell having a chamber formed therein, said shell having a transversely extending wall portion adjacent one of its ends providing an end wall for said chamber closely adjacent the end of said plug, said end wall having an opening formed therein adjacent the longitudinal center line of the plug, a central electrode extending into said chamber, and a substantially U-shaped ground electrode extending a substantial distance across the outer side of said end wall to adjacent the central portion of the plug and thence into said chamber through said opening and into overlapping relationship with said central electrode.

4. A spark plug comprising a shell having a chamber formed therein and providing side walls for said chamber, a transversely extending wall at one end of said shell providing an end wall for said chamber of substantially lesser thickness than the thickness of said side walls, said end wall having an opening formed therein adjacent the central longitudinal line of the plug and of substantially lesser diameter than the diameter of said chamber, a central electrode extending into said chamber, and a substantially U-shaped ground electrode extending across a substantial portion of the outer side of said end wall to adjacent the central portion of the plug and thence into said chamber adjacent the central portion thereof to adjacent said central electrode.

5. A spark plug comprising a shell having a chamber formed therein and providing side walls for said chamber, the inner surface of said side walls being inclined toward each other and terminating at their lower ends in a transversely extending wall at one end of said shell providing an end wall for said chamber of substantially lesser thickness than the thickness of said side walls, said end wall having an opening formed therein adjacent the longitudinal center line of the plug and of substantially lesser diameter than the diameter of said chamber, a central electrode extending into said chamber, and a ground electrode extending across a substantial portion of the outer side of said end wall to adjacent the central portion of the plug and thence into said chamber adjacent the central portion thereof and into overlapping relationship with respect to said central electrode.

6. A spark plug comprising a shell having a chamber formed therein and providing side walls for said chamber, the inner surface of said side walls being inclined toward each other and terminating at their lower ends in a transversely extending wall at one end of said shell providing an end wall for said chamber and of substantially lesser thickness than the thickness of said side walls, said end wall having an opening formed therein substantially concentric with the longitudinal center line of the plug and of substantially lesser diameter than the diameter of said chamber, a central electrode extending into said chamber, and a ground electrode extending across a substantial portion of the outer side of said end wall to adjacent the central portion of the plug and thence inwardly through said opening into said chamber adjacent the central portion thereof and into overlapping substantially parallel relationship with respect to said central electrode.

7. A spark plug comprising a shell having a chamber formed therein, a wall portion adjacent the end of said plug providing an end wall for said chamber, said end wall having an opening formed therein adjacent the longitudinal center line of the plug, a central electrode extending into said chamber, and a ground electrode arranged to be in good heat conductive relation to the region just below said end wall and extending from said shell to adjacent the central portion of said plug and thence into said chamber adjacent said central electrode.

8. A spark plug comprising a shell having a chamber formed therein, said shell having a relatively thin wall portion providing an end wall for said chamber adjacent the end of said plug, said wall having an opening formed therein adjacent the longitudinal center line of the plug and of substantially less diameter than the diameter of said chamber, a central electrode extending into said chamber, and a ground electrode attached to said shell in good heat conductive relation to the region adjacent said end wall and extending to adjacent the central portion of said plug into said chamber in overlapping relationship with said central electrode.

9. A spark plug comprising a shell having a chamber formed therein and providing side walls for said chamber, a transversely extending wall at one end of said shell providing an end wall for said chamber of substantially lesser thickness than the thickness of said side walls, said end wall having an opening formed therein adjacent the central longitudinal line of the plug and of substantially lesser diameter than the diameter of said chamber, a central electrode extending into said chamber, and a ground electrode attached to said shell in good heat conductive relation to the region adjacent said end wall, said ground electrode extending across a portion of said end wall opening to adjacent the central portion of the plug and thence within said chamber into overlapping relationship with said central electrode.

WALTER P. INNES, JR.